3,563,849
ISOCYANATE MODIFIED POLYESTER REINFORCING ELEMENTS AND RUBBER STRUCTURES MADE THEREFROM
Grover W. Rye, Cuyahoga Falls, and Roop S. Bhakuni and Joseph L. Cormany, Jr., Akron, Ohio, assignors to The Goodyear Tire & Rubber Company, Akron, Ohio, a corporation of Ohio
No Drawing. Filed June 14, 1968, Ser. No. 736,975
Int. Cl. C08d 11/04; C08f 45/62; C08g 39/10; D02g 3/48
U.S. Cl. 161—176                                    9 Claims

ABSTRACT OF THE DISCLOSURE

Relates to an improved rubber structure reinforced with an improved polyester reinforcing fiber modified with either an isocyanate or in combination with a polycarbonate present in the polyester prior to fiber formation.

---

This invention relates to an improved rubber structure reinforced with an improved polyester reinforcing fiber modified with an isocyanate present in the polyester prior to fiber formation.

Pneumatic tires are being subjected to increasingly severe operating conditions including high speeds and heavy loads. Rubber used in the tire is reinforced with such materials as rayon, nylon, polyester, wire, and glass fibers. Maximum reinforcement of the rubber is obtained with a given fiber when maximum adhesion is produced between the rubber and fiber. Polyethylene terephthalate tire cords are particularly desirable to use as reinforcing elements because of their excellent dimensional stability as shown by low growth or stretch during service. However, it has been observed that in the environment of the rubber of a pneumatic tire the heat generated under high speeds and heavy loads causes the polyester cord to lose tensile strength and ultimately adhesion to the rubber.

The chemical environment of the rubber of a tire is complex because many different chemicals are needed in its construction in order to obtain maximum tire performance. Because of this chemical complexity in the rubber and the severe heat developed during service, a variety of chemical reactions result in the degradation of the polyester cord and the adhesive bond between the cord and the rubber.

Many attempts have been made to minimize these destructive forces and the present invention is an advance in solving the problems created by these destructive forces. Prior attempts have been made by modifying the rubber. Other attempts have been directed toward the adhesive. The present invention is directed toward the polyester cord.

It has now been discovered that a more thermally stable pneumatic tire may be made when the rubber thereof is reinforced with a modified polyester cord described herein.

The thermally stable tire is made possible by the discovery that a polyester cord used in the construction of the pneumatic tire can be protected against tensile loss in the cord and degradation of the adhesive bond between the cord and the rubber by incorporating with the polyester a critically small amount of a modifier which is (1) physically and chemically compatible with the polyester, (2) reactive with the polyester within the limitation of time and temperature existing in an extruder used in melt spinning the polyester, generally less than 10 minutes and preferably 1 to 4 minutes and between 10 to 60° C. above the melting point of the polyester at normal pressures, (3) of the proper melt viscosity to prevent dripping of the spun resin which may occur when the melt viscosity is too low and to prevent excessive pack pressure during extrusion which may occur if the melt viscosity is too high, (4) of such nature that its degradation products will not be harmful to the polyester; otherwise a drop in tensile will occur, (5) of such a nature as to impart or not interfere with good spinning and drawing of the polyester control of which may be achieved by controlling the reaction during extrusion; otherwise, if no control is possible, then excessive crosslinking may occur and the resin will be difficult to properly draw, and (6) of a high melting point and a low vapor pressure thereby imparting efficiency in the processing of the material being drawn. Such a modifier has been discovered to be an isocyanate or isocyanate generating compound in the polyester prior to fiber formation.

It has also been observed that an exceptional increase in hot adhesion is obtained when a small amount of a polycarbonate is added with the isocyanate to the polyester chips prior to fiber formation.

It is believed that certain desirable reactions take place between the isocyanate and certain undesirable by-products present in the polyester to form a reaction product which is less detrimental to the polyester at elevated temperatures than are the by-products. Also, it is believed that the isocyanate per se provides adhesive sites on the surface of the formed polyester fiber which may account for the exceptionally desirable bonding obtained between the isocyanate modified polyester fiber and the rubber being reinforced.

Any isocyanate or isocyanate generating compound may be added to the polyester chips prior to fiber formation. Typical isocyanates that may be used are:

Polymethylene polyphenylisocyanate (sometimes referred by the trademark "PAPI")
Triphenyl methane-triisocyanate
2,4-tolylene-diisocyanate and dimer (sometimes referred to by the trademark "Desmodur TT") (preparation for which see British 1,088,580)
2,6-tolylene-diisocyanate
Bitolylene diisocyanate
Dianisidine diisocyanate
Hexamethylene diisocyanate
m-Phenylene diisocyanate
1-alkyl-benzene-2,4-diisocyanate
1-alkyl-benzene-2,5-diisocyanate
2,6-dialkyl-benzene-1,4-diisocyanate
1-chlorobenzene-2,4-diisocyanate
Dicyclohexylmethane-diisocyanate
3,3-dimethoxy diphenyl methane-4,4'-diisocyanate
1-nitrobenzene-2,4-diisocyanate
1-alkoxy-benzene-2,4-diisocyanate
1-alkylbenzene-2,6-diisocyanate
m-Xylylene-diisocyanate
1,3-dimethyl-4,6-bis ($\beta$-isocyanatoethyl)-benzene-diisocyanate
Hexahydrobenzidine-4,4'-diisocyanate
Ethylene-diisocyanate
Propylene-1,2-diisocyanate
Cyclohexylene-1,2-diisocyanate
3,3'-dichloro-4,4'-biphenylene diisocyanate
Cyclohexyl isocyanate
2,3-dimethyl-tetramethylene diisocyanate
p,p'-Diphenylene diisocyanate
2-chlorotrimethylene diisocyanate
Butane-1,2,2-triisocyanate
Trimethylene diisocyanate
Tetramethylene diisocyanate
Propylene-1,2-diisocyanate
Butylene-1,2-diisocyanate
Ethylidene diisocyanate
Phenyl isocyanate.

Polymethylene polyphenylisocyanate, identified above by the trademark "PAPI" is also referred to as polyaryl polyisocyanate and being a dark amber somewhat viscous liquid belonging to the aromatic polyisocyanate family as disclosed in a new product bulletin issued by The Carwin Company of North Haven, Conn., dated 1956. "PAPI" is further described as containing both ortho and para subsitution and composed of a family of low molecular weight polymers having an average composition of the trimer with $n$ in the formula above having an average value of 1 and manufactured under U.S. Pat. 2,683,730, the formula being shown therein.

Typical isocyanate generating compounds are blocked isocyanates which include all reaction products of an isocyanate and a compound having a hydrogen reactive with the isocyanate group. Examples of the blocking compounds include monohydroxy compounds, especially primary and secondary alcohols, details of preparation being disclosed in U.S. Pats. 2,952,665 and 3,325,333, amines including urea, primary and secondary mono and polyhydric phenols including phenol and resorcinol (when phenol is used to block "PAPI," the resulting compound is known by the trademark "Hylene MP" as more fully described in "Adhesives Age," 2, 30–33 (1959)), amides as well as lactams, details of preparation being disclosed in Belgian Pat. 665,474, when caprolactam is used to block "PAPI" the resulting compound is known by the trademark "Isonate" 123P, and resinous compositions which have an active hydrogen and will block an isocyanate. The preferred type of resinous blocking agent is made by reacting an aldehyde with a resin-forming component such as urea, or a phenol, preferably a polyhydric phenol, such as resorcinol. Suitable aldehydes that may be used in forming a resin include formaldehyde, acrolein, glyoxal, furfural, crotonaldehyde, aldol and benzylaldehyde. Suitable phenols that may be reacted with one of the aforementioned aldehydes, include phenol, cresol, catechol, phloroglucinol, saligenin, dibeta naphthol, xylenol, hydroquinone, resorcinol, orcinol, pyrogallol, betanaphthol, aminophenol, guaiacol, as well as urea and melamine. More detail of preparation is disclosed in U.S. Pat. 3,268,467.

When the hydroxy compound is reacted with the isocyanate to form a blocked isocyanate, the isocyanate group is converted to a urethane group and the following general formula may be used to express this conversion: ROH+R'NCO→ROCONHR'. With a polyisocyanate the reaction may be expressed in terms of the following general formula: ROH+OCNR'NCO→ROCONHR'NCO wherein R and R' represent mono and divalent organic radicals. Suitable hydroxy compounds include aliphatic, araliphatic and hydroaromatic alcohols such as methanol, ethanol, butanol, isobutanol, octyl alcohol, cyclohexanol, benzyl alcohol, xylenols, cresols, resorcinol and phenol and mixtures thereof.

When a lactam is reacted with an isocyanate to form a lactam blocked isocyanate the isocyanate group is converted to a urethane group. The following general formula may be used to express this conversion:

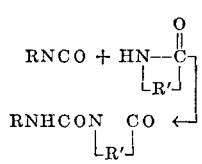

wherein R and R' are any organic radical up to 8 carbons. A more specific embodiment of a lactam blocked isocyanate is one involving the following reaction:

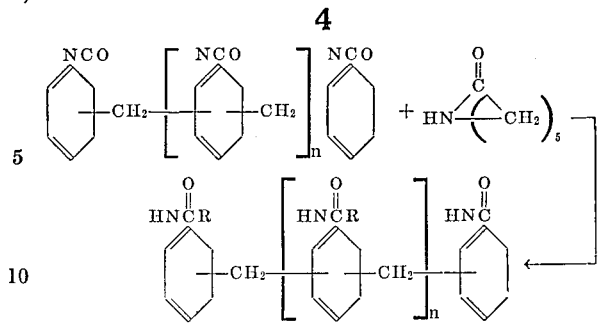

wherein when R is the lactam above and $n$ is 1 the product is sometimes commercially referred to as "Isonate" 123P and described in a bulletin dated Sept. 1, 1966, published by the Upjohn Company Polymer Chemicals Division.

The amide blocked isocyanates are made in a manner similar to the manner described above for the amines and the ureas.

The term "isocyanate" includes both an isocyanate or polyisocyanate per se as well as an isocyanate generating agent.

It is preferred to add the isocyanate or isocyanate generating compound in pellet form to the polyester chips just prior to the introduction of the mixture into the extruder associated with the spinning of the resulting molten mixture into filaments. The polyester and modifier may be physically blended as a master batch as solids in a double cone dryer and then feeding the blend or separate materials in an exact ratio at the throat of the extruder.

The improvements of this invention are observed when less than about 2 parts by weight and at least about .01 part by weight of isocyanate is added to 100 parts of polyester and preferably from about .05 part to about .2 part. It is essential that when the isocyanate is to be intimately blended with the polyester in the molten state which occurs in the range from about 270° C. to about 310° C. that the molten blend be maintained under a pressure of about 800 lbs. per square inch for not more than 10 minutes, preferably for from 1 to 4 minutes, and out of contact with oxygen, a condition present in melt spinning apparatus.

The improved fiber to be used in this invention is made as indicated above by adding an isocyanate to a polyester. The polyester is any fiber forming thermoplastic linear high molecular weight condensation polyester, and particularly polyethylene terephthalate as well as polymers of cyclohexanedimethylene terephthalate. These polyesters as well as copolyesters of aromatic dicarboxylic acids and particularly condensation products of ethylene glycol with a mixture of terephthalaic acid and isophthalic acid, ethylene glycol with terephthalic acid and another dibasic acid such as sebasic or adipic acid or hydroxycarboxylic acid such as parahydroxy benzoic acid present in small amounts and polyesters of terphthalic acid with the glycol 1,4 bis(hydroxymethyl) cyclohexane. By linear terephthalic polyesters is meant a linear condensation polyester comprising recurring glycol dicarboxylate structural units in which at least about 85% of the recurring structural units are units of the formula

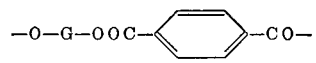

wherein G represents a divalent organic radical containing from about 2 to about 8 carbon atoms which is attached to the adjacent oxygen atoms by saturated carbon atoms. The terephthalate radical may be the sole dicarboxylate constituent of the recerring structural units or up to about 15% of the structural units may contain other dicarboxylate radicals such as adipate, sebacate, isophthalate, 4,4' dibenzoate and hexahydroterephthalate. By high molecular weight is meant polyesters having an intrinsic viscosity of at least 0.4 and preferably greater than 0.6 and as high as 1.5 as measured in a 60/40 phenol/ tetrachlorethane mixed solvent at 30° C. It is preferred that the polyethylene terephthalate and other similar polyesters have a high melting point which for polyethylene terephthalate is about 265° C. measured with a hot stage polarizing microscope. Generally the polyester fibers of this invention may be prepared in accordance with well-known procedures for melt extrusion and drafting.

The rubber component of the rubber structure of this invention may be any rubber that is a stretchable composition having a tendency to return to its approximate original shape after being vulcanized, and particularly any rubber that is used in the manufacture of tires and drive belts. Thus, the laminate of this invention may involve natural rubber otherwise known as Hevea Brasiliensis, or conjugated diene polymeric rubbers made by polymerizing butadiene-1,3, isoprene, 2,3 - dimethyl butadiene-1,3, and mixtures of these conjugated dienes as well as copolymers of these diene monomers with up to 50% of compounds which a contain a $CH_2=C=$ group and which are copolymerizable with butadiene-1,3 where, for example, at least one of the valences is attached to an electronegative radical, that is a radical which increases the polar character of the molecule such as vinyl, phenyl, nitrile and carboxyl radicals. Examples of the diene rubbers are polybutadienes including the stereospecifics, polyisoprenes including the stereospecifics, butadiene/styrene copolymers, also known as SBR, and butadiene/acrylonitrile copolymers also known as NBR.

The following example discloses how an improved polyester cord may be made by adding an isocyanate to polyester chips and then forming filaments therefrom.

EXAMPLE 1 (PEBPIMPE)

100 parts of dried polyethylene terephthalate (PE) chips are tumbled with 1 part of a polyester blocked polyisocyanate (PEBPI) resulting from the reaction of 100 parts of the hydroxy polyester from the reaction of 11 mols of ethylene glycol and 10 mols of adipic acid, 9 parts of 1,4-butandiol blocked with 40 parts of 4,4'-diphenyl methane diisocyanate having an HCl acidity of 0.017% and commercially available as "Texin" 192A sold by Mobay, until the mixture is substantially homogeneous. The resulting blend of the polyester blocked polyisocyanate and polyester (PEBPIMPE) is melt spun at a temperature of 290° C. through a 190 hole spinneret at a spinning speed of 150 yards per minute to give a single spun yarn having a total denier of approximately 7800. The spun yarn is passed to a pair of rotating heated feed rolls and then passed around a pair of heated draw rolls rotating at a speed to impart a draw ratio of about 6 to 1 to give a total denier of approximately 1300 and then wound on a bobbin. The modified polyester yarn has a tenacity of 7.9 grams per denier, a break elongation of 12.4, an intrinsic viscosity of .790, a tensile strength of 23.3 lbs., and an elongation at 10 lbs. pull of 5.6%.

The yarn produced above is plied 8 turns per inch, 3 of these plies are twisted in reverse direction 8 turns per inch to form the cord used in producing the improved rubber structure of this invention. The resulting cord has a break strength of 62.9 lbs., a 5% modulus (lase) of 14.3, a 10% modulus (lase) of 29.0, and an elongation at break of 17.8%. The resulting polyester blocked polyisocyanate modified polyester cord is identified as cord sample A. The unmodified polyester was processed into filaments and a cord made in the exact manner described above and identified as cord sample B.

Both cord samples A and B were treated with R/F/L adhesive made in the following manner. A 20% solids dispersion of a conventional R/F/L adhesive is made by adding 8.9 parts of resorcinol to 6.55 parts of a 37% solution of formaldehyde and 5 parts of a 10% solution of sodium hydroxide which is then added to a latex mixture comprising 35.5 parts of a 39.5% total solids of the 70/15/15 terpolymer of butadiene/styrene/vinyl pyridine and 64 parts of a 40.7% total solids of a 70/30 copolymer of butadiene/styrene, the mixture being in 130.05 parts of water. Certain of the cords are passed through a dip tank containing this adhesive. The dipped cords are then dried at 450° F. and embedded in rubber compounded as shown below and then peel adhesion test is made of a one-inch strip under static conditions at 250° F. Thermal stability of the cord is measured in terms of percent tensile retained by the air bomb (AB). Air bomb testing is done by heating the untreated cord embedded in the rubber compound as shown below for 2.5 hours at 350° F. under 80 p.s.i. air pressure. The data obtained is listed in Table I, in comparison to a control of 100.

EXAMPLE 2 (DTTMPE)

The dimer of 2,4-tolylene-diisocyanate (also known by the trademark Desmodur TT) is added in an amount of 0.1 to 100 parts of dried polyethylene terephthalate (PE) chips and mixed to form a homogeneous mixture. The resulting blend (DTTMPE) is then melt spun at a temperature of 290° C. through a 190 hole spinneret under the same conditions described in Example 1. This yarn, made of (DTTMPE), is then tested in the same manner as shown in Example 1 and the resulting data reported in Table I.

EXAMPLE 3 (RFBPIMPE)

A resorcinol/formaldehyde resin blocked polymethylene polyphenylisocyanate was prepared in the manner described in Examples 1 and 2 of the U.S. Pat. 3,268,467 except that 20 parts of methyl butyl ketone was used in place of the 20 parts of water and water-free formaldehyde was used in place of the 37% formaldehyde in water. A solid product identified as (RFBI) was obtaining having a M.P. above 100° C. To 100 parts of dried polyethylene terephthalate (PE) chips was added 0.1 part of the product identified as RFBPI and this blend was then processed in the same manner described about in Example 1 of this invention and the resulting data reported in Table I below.

EXAMPLE 4 (CLBPIMPE)

A caprolactam blocked polymethylene polyisocyanate is added in an amount of 0.1 part to 100 parts of dried polyethylene terephthalate (PE) chips and mixed to form a homogeneous blend. The resulting blend identified as (CLBPIMPE) was then melt spun at a temperature of 290° C. in the same manner described for the blend in Example 1. The resulting cord was then treated and tested in the same manner as described in Example 1 and the data reported in Table I.

Each of the Examples 1, 2, and 4 above were rerun except that in the case of Example 1, .5 part of the PEBPI was used and 2 parts of a polycarbonate was added at the same time to produce a thermally more stable cord as shown by the data reported in Table II. In a rerun of Example 2, .1 part of DTTBPI and 1% of polycarbonate were used, the results being reported in Table II.

TABLE I

| Example | (1) Adhesive 1" strip hot static | (2) Mallory fatigue, KC | (3) Percent tensile retained |
|---|---|---|---|
| (1) Control (PE cord sample B of Ex. 1, 1,300/3, 8/8) | 100 | 100 | 100 AB |
| (2) PEBPIMPE (Cord sample A of Ex. 1, 1,300/3, 8/8) | 129 | 184 | 115 AB |
| (3) DTTMPE (Example 2 cord, 1,300/3, 8/8) | 102 | 158 | 107 AB |
| (4) RFBPIMPE (Example 3 cord, 1,000/3, 10/10) | 100 | 106 | 109 AB |
| (5) CLBPIMPE (Example 4 cord, 1,000/3, 10/10) | 123 | 314 | 108 AB |

TABLE II

| Example | (1) Adhesive 1″ strip hot static | (2) Mallory fatigue, KC | (3) Percent tensile retained |
|---|---|---|---|
| (6) Control (PE plus 2 parts polycarbonate cord, 1,300/3,10/10) | 100 | 100 | 100AB |
| (7) PE plus .1 part DTTBPI plus 1 part polycarbonate | 130 | 139 | 98AB |
| (8) PE plus .1 part CLBPI plus 1 part polycarbonate | 123 | 98 | 102AB |
| (9) PE plus .5 part PEBPI plus 2 parts polycarbonate | 149 | 116 | 103AB |

The polyester cords used in these examples were made by first twisting yarn 8 or 10 turns per inch and then twisting three of these singles 8 or 10 turns per inch to form a cord.

The polycarbonate as a powder or fine particles is added to the polyester together with the other modifying agent usually in the form of chips or granules and the mixture is then passed to a melting zone as in an extruder and then forwarded by means of gear pumps or the like to a filter pack and a spinneret from which filaments are formed in a continuous manner. A number of these filaments are gathered into a yarn, which yarn is then twisted to form a ply, a number of which plies are then twisted to form a cord.

Any polycarbonate may be used as an additive or modifier or scavenger or protective agent in combination with the other modifier or scavenger or protective agents for polyester tire cord. Broadly, the polycarbonates may be any derived from 4,4′-dihydroxy-di(mononuclear aryl)-alkane and having a molecular weight between about 15,000 and about 80,000 and an intrinsic viscosity between about .46 and about 1.2 as measured by dilute solution viscometry in methylene chloride at 25° C. These polycarbonates can be prepared in accordance with conventional methods including phosgenation in which phosgene is blown into the 4,4′-dihydroxy-di(mononuclear aryl)-alkane in the presence of a aqueous solution of a caustic alkali and a solvent. The ester-interchange method may also be used wherein a 4,4′-dihydroxy-di(mononuclear aryl)-alkane is reacted with a diester of carboxylic acid and as more fully described in British Pat. 772,627.

The polycarbonate used in the present invention was a polyester of carbonic acid and bisphenol A known as [bis-(4-hydroxy phenyl)2,2-propane] and having the repeating unit structure

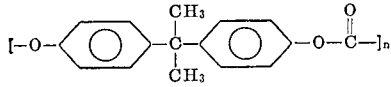

wherein $n$ is a measure of the molecular weight and may be at least 10 and up to 400, and averages 115 in Examples 6 through 9.

The polyester cord is embedded in rubber compounded in accordance with the following formula:

| Ingredients | Parts by weight | |
|---|---|---|
| | Amount used | May be used |
| (1) Natural rubber | 70 | 0–100 |
| (2) OE/SBR 1778 (styrene/butadiene-1,3 23.5/76.5 copolymer) (plus 37½ parts oil per 100 SBR) | 27.5 | 100–0 |
| (3) Cis 1,4-polybutadiene | 10 | 0–50 |
| (4) Carbon black (reinforcing agent) | 40 | 25–100 |
| (5) Zinc oxide (activator of cure) | 4 | 2–10 |
| (6) Stearic acid (activator of cure) | 2 | 1.5–3.0 |
| (7) Primary accelerator (2,2′-dithiobisbenzothiazole) | 1.25 | .5–3.0 |
| (8) Pine oil (softener) | 10 | 2–50 |
| (9) Secondary accelerator (tetramethyl thiuram disulfide) | .10 | .05–1.0 |
| (10) Antioxidant (hindered phenol) | .60 | .1–4 |
| (11) Sulfur (vulcanizing agent) | 2.5 | 1.0–5.0 |

In compounding the rubber stock in accordance with the formulation set forth above, a masterbatch of ingredients 1 and 2 are made with the carbon black and mixed on a mill to a temperature of about 110° C. and may be mixed at a temperature as high as 140° C. The resulting carbon black masterbatch is then cooled and the remaining compounds are mixed into the batch in the order indicated above to a temperature of about 70° C. and may be mixed at a temperature as high as 100° C.

The rubber structure of this invention may be prepared by first coating a reinforcing fabric with the rubber and then using the rubber coated fabric to make any desired structure as, for example, a pneumatic tire. The rubber will be compounded in the manner set forth above. The reinforcing fabric may be used without any previous treatment, and under these conditions the fabric is known as grey cord indicating that no treatment in the form of an adhesive composition has been applied to the surface of the cord. Thus, the present invention may be used in the manufacture of a pneumatic tire of conventional present day design as shown, for example, in such U.S. Pats. as 3,157,218; 3,160,191; 3,160,192; 3,217,778; 3,225,810; 3,225,812; 3,244,215; 3,253,633 and 3,253,638 all of which show a vulcanized rubberized fabric carcass of generally torodial shape having a tread portion superimposed and bonded to the crown area of the carcass and plies of rubberized fabric forming sidewalls extending from the tread over the carcass to the bead portion.

While certain representative embodiments and details have been shown for the purpose of illustrating the invention, it will be apparent to those skilled in this art that various changes and modifications may be made therein without departing from the spirit or scope of the invention.

What is claimed is:

1. A heat stable structure comprising a heat stable polyester tire cord bonded to rubber, the cord being made of polyethylene terephthalate fibers melt spun from a melt composition resulting from melting a physical mixture of polyethylene terephthalate having an I.V. of at least .6, and an organic isocyanate present in the mixture in an amount between about .01 part to about 2 parts per 100 parts of polyester.

2. The structure of claim 1 wherein the isocyanate in the mixture is a blocked isocyanate.

3. The structure of claim 2 wherein the isocyanate is blocked with a blocking agent selected from the group consisting of primary and secondary alcohols, monohydric and polyhydric phenols, amines, amides, lactams, and resinous reaction products of an aldehyde and a component selected from the group consisting of urea, phenol, and resorcinol.

4. The structure of claim 1 wherein a polycarbonate derived from a 4,4′-dihydroxy di(mononucleararyl)-alkane is present in the mixture in an amount up to about 2 parts per 100 parts of polyester.

5. The structure of claim 4 wherein the polycarbonate is the reaction product of carbonic acid and bis phenol A and has the repeating unit

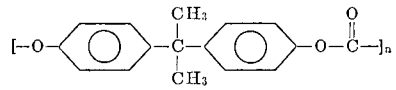

wherein $n$ has a value from about 10 to 400.

6. A method of improving the heat stable characteristics of a melt spun polyester fiber which comprises melt spinning a melt composition resulting from the melting of a physical mixture of polyethylene terephthalate having an I.V. of at least .6, and an organic isocyanate present in the mixture in an amount between about .01 part to about 2 parts per 100 parts of polyester.

7. The fiber of the method of claim 6.

8. A method of improving the heat stable characteristics of a melt spun polyester fiber which comprises melt spinning a melt composition resulting from the melting of a physical mixture of polyethylene terephthalate having an I.V. of at least .6, a polycarbonate derived from a 4,4′ dihydroxy di(mono nuclear aryl)-alkane present in an amount up to not more than 2 parts per 100 parts of polyester and an organic isocyanate present in the mixture in an amount between about .01 part to about 2 parts per 100 parts of polyester.

9. The fiber of the method of claim 8.

References Cited

UNITED STATES PATENTS

| | | | |
|---|---|---|---|
| 3,403,128 | 9/1968 | Berndt et al. | 260—45.8 |
| 2,625,531 | 1/1953 | Seeger | 260—858 |
| 2,983,702 | 5/1961 | Little et al. | 260—858 |
| 3,051,212 | 8/1962 | Daniels | 260—75 |
| 3,107,235 | 10/1963 | Larson et al. | 260—75 |
| 3,214,489 | 10/1965 | Park | 260—858 |
| 3,450,793 | 6/1969 | Schnell et al. | 260—858 |

FOREIGN PATENTS

| | | | |
|---|---|---|---|
| 132,546 | 5/1949 | Australia | 260—860 |

HAROLD D. ANDERSON, Primary Examiner

E. WOODBURY, Assistant Examiner

U.S. Cl. X.R.

152—330, 359; 161—172, 175, 231; 260—45.7, 45.75, 45.8, 75, 858, 860